United States Patent Office 3,649,603
Patented Mar. 14, 1972

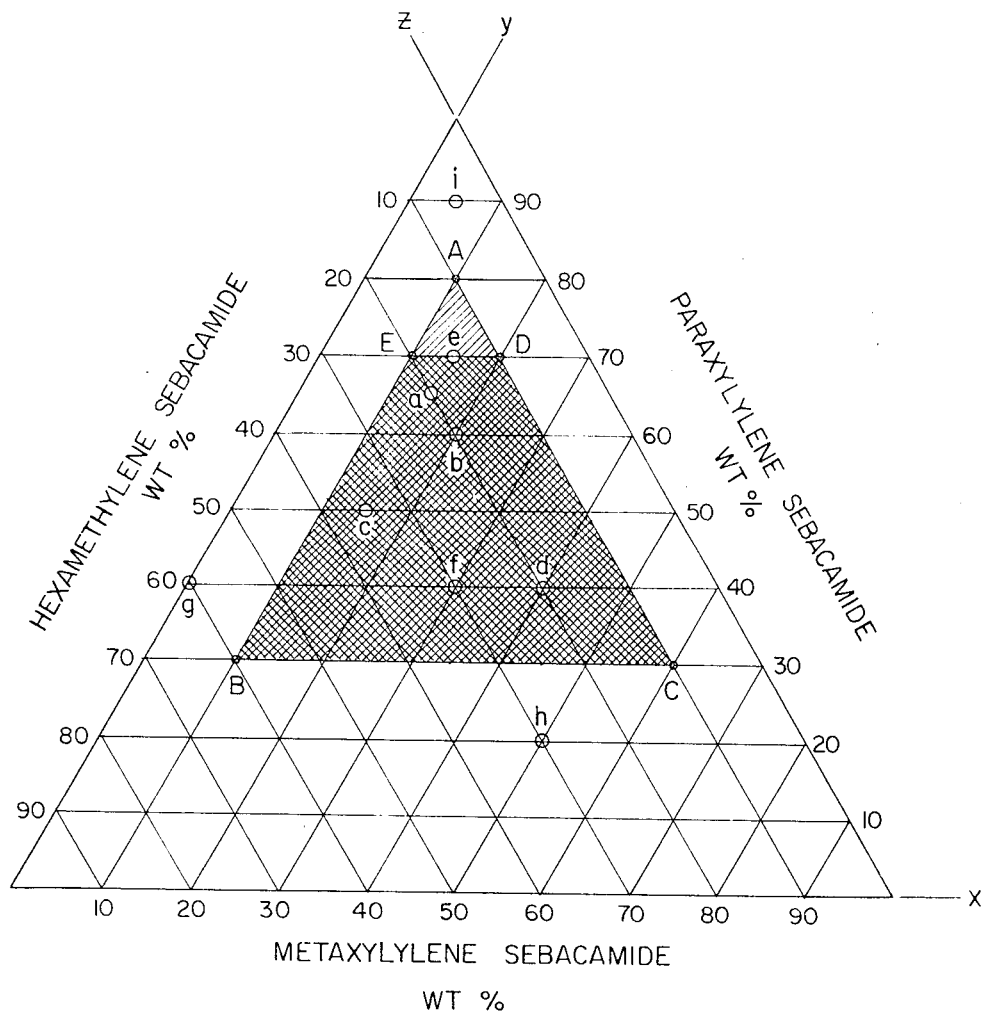

3,649,603
TERNARY COPOLYAMIDES FROM SEBACIC ACID, HEXAMETHYLENE DIAMINE AND XYLYLENE DIAMINES
Yoshizo Tsuda, Akinori Yamamoto, and Kozyuro Ikeda, Otsu-shi, Japan, assignors to Toray Industries, Inc., Tokyo, Japan
Filed Aug. 13, 1969, Ser. No. 849,704
Claims priority, application Japan, Sept. 10, 1968, 43/64,679
Int. Cl. C08g 20/20
U.S. Cl. 260—78 R    2 Claims

ABSTRACT OF THE DISCLOSURE

Strong, crystalline, low modulus, low shrinkage filaments are formed by drawing and melt spinning a novel ternary copolyamide consisting, by weight, of 30–80% (preferably 30–70%) paraxylylene sebacamide, 10–60% metaxylylene sebacamide, and 10–60% hexamethylene sebacamide. The copolyamide is made by polymerizing the three sebacamide salts under pressure at a temperature below 300° C.

---

The present invention relates to ternary copolyamides and fibers which do not tend to shrink a great deal, and which are good in crystallinity and excellent in heat setting property; further it relates to a process for the preparation of such a fiber. More particularly, the invention relates to melt spun filaments of a ternary copolyamide consisting of paraxylylene sebacamide, metaxylylene sebacamide and hexamethylene sebacamide and having a composition within the zone ABC in the accompanying figure and a process for the preparation thereof.

Heretofore for the purpose of raising the initial Young's modulus of a polyamide fiber, polyamides having aromatic rings have been proposed. For example, when paraxylylene diamine or metaxylylene diamine and various kinds of aliphatic dicarboxylic acid are polycondensed, aromatic polyamides, having aromatic rings in their main chain and amide groups linked thereto, are obtained. Fibers of such polyamides have been evaluated. However, a polyamide from metaxylylene diamine has not been commercialized because its properties are inferior when it is exposed to wet heat. Fibers of polyamide from paraxylylene diamine have received only limited consideration because the melting point of this material, above 270° C., is too high. In order to avoid these limitations, various processes for the preparation of a copolymer from aromatic polyamides have been proposed. For example, copolymerization of a polyamide from paraxylylene and a polyamide from hexamethylene diamine (U.S. Pat. 3,012,994) and copolymerization of a polyamide from paraxylylene diamine and a polyamide from metaxylylene diamine (British Pat. 766,927) to obtain an isomorphous copolymer have been known. However, these copolymers have been known only as isomorphous copolymers from the measurement of their melting points. Nothing has been known about the degrees of isomorphous substitution, the degrees of crystallinity and orientation due to drawing and the dimensional stability of the fibers spun from these copolymers. And even if it is generally called as the isomorphous substitution, lowering of crystallinity takes place at various degrees. Therefore it has been known that the fiber properties of these materials vary considerably.

With a view to lowering the melting point of polyparaxylylene sebacamide and keeping the degree of crystallinity high enough for good fiber properties, the present inventors have discovered that a ternary copolyamide consisting of polyparaxylylene sebacamide, metaxylylene sebacamide and hexamethylene sebacamide is a good crystalline copolymer which is suitable for the object and which provides a fiber having superior properties.

Further, the present inventors found that a ternary copolyamide fiber having a composition shown by a point within the zone ABC depicted in the accompanying figure, about which mention will be made later, gives after being drawn, a drawn yarn having a small boiling water shrinkage, a high strength, a high initial Young's modulus and relatively good dyeability by acidic dyestuffs. Further, this copolyamide fiber, having good crystallinity, is excellent in heat setting property and forms a fabric good in dimensional stability. False twisting said yarn, with its good heat setting property, produces a textured yarn having good crimp characteristics. The yarn of the present invention is especially useful as a component of a composite fiber with another polymer fiber having a higher heat shrinkage, preferably a polyamide fiber. This composite then has a lower heat shrinkage than a filament of the other polymer alone. Such a composite fiber may be made by mix spinning or mix weaving the fiber of the present invention with filaments prepared from said other polymer.

Hitherto used homopolyamide consisting only of paraxylylene sebacamide has a melting point of 276° C. Moreover, because this polyamide tends to give rise to gelation and coloration at a temperature above 300° C., it is difficult to polymerize it stably on an industrial scale.

In contrast, because the ternary copolyamide of the present invention has a melting point below 270° C., it can be polymerized at a temperature below 300° C. Gelation and coloration are therefore avoided and this material can be readily polymerized and melt spun on an industrial scale. Because the spun filament of a ternary copolyamide thus obtained has good crystallinity, it also has good orientation due to drawing and the yarn after being drawn does not tend to shrink a great deal in boiling water. Moreover, it exhibits high strength and a high initial Young's modulus.

For a more detailed description of the invention, reference is made to the accompanying figure, which is a composition diagram of a three component composition, wherein the concentration of metaxylylene sebacamide is indicated on the "$x$" axis, the concentration of hexamethylene sebacamide is indicated on the "$y$" axis and the concentration of paraxylylene is indicated on the "$z$" axis. Concentration in all cases is in weight percent.

The composition of the ternary copolyamide according to the present invention is a composition shown by a point within a triangle ABC connecting point A, point B and point C in the figure. The point A in FIG. 1 shows composition of a terpolymer consisting of 80% by weight of paraxylylene sebacamide, 10% by weight of metaxylylene sebacamide and 10% by weight of hexamethylene sebacamide. The point B therein shows composition of a terpolymer consisting of 30% by weight of paraxylylene sebacamide, 10% by weight of metaxylylene sebacamide and 60% by weight of hexamethylene sebacamide and the point C therein shows composition of a terpolymer consisting of 30% by weight of paraxylylene sebacamide, 60% by weight of metaxylylene sebacamide and 10% by weight of hexamethylene sebacamide.

Generally then, the composition of the terpolymer of the present invention consists of 30–80 weight percent paraxylylene sebacamide, 10–60 weight percent metaxylylene sebacamide and 10–60 weight percent hexamethylene sebacamide.

The preferred range of compositions of the present invention is that within quadrangle BCDE connecting points B, C, D and E in the composition diagram of the figure.

The point D in the figure indicates a terpolymer composition consisting of 70% by weight of paraxylylene sebacamide, 20% by weight of metaxylylene sebacamide and 10% by weight of hexamethylene sebacamide, while the point E therein indicates composition of a terpolymer consisting of 70% by weight of paraxylylene sebacamide, 10% by weight of metaxylylene sebacamide and 20% by weight of hexamethylene sebacamide. Thus, the preferred compositions of the present invention consist of 30–70 weight percent paraxylylene sebacamide, 10–60 weight percent hexamethylene sebacamide.

The foregoing compositions have excellent properties in several respects including melting points, low shrinkage (when tested by a relaxed treatment in boiling water), high initial Young's modulus, and good orientation due to drawing, which produces desirable strength and elongation.

When the concentration of paraxylylene sebacamide exceeds 80% by weight, the melting point of the terpolymer exceeds 270° C. Also, undesirable gelation and coloration occur when the polymer is spun. As preferred, however, concentration of paraxylylene sebacamide is less than 70% by weight, the melting point is below 265° C. and polymerization can be carried out stably. If the concentration of paraxylylene sebacamide is less than 30% by weight, the melting point is less than 200° C. and the characteristic properties of an aromatic polyamide do not appear in the finished yarn. Specifically, the initial Young's modulus is unsuitably low. When the concentration of metaxylylene sebacamide becomes large, the initial Young's modulus advances.

The ternary copolyamide according to the present invention gives undrawn filaments which have a melting point of 270–200° C., and which are good in crystallinity, drawability, and heat stability. Further, this material is free of coloration at the time of polymerization and melt spinning, and is easy to melt spin. When drawn, it gives a polyamide yarn having high strength, low boiling water shrinkage and, when the concentrations of paraxylylene sebacamide and metaxylylene sebacamide are high, high in initial Young's modulus. Generally, it has been shown that superior properties in many respects can be obtained.

More particularly, the ternary copolyamide fiber of the present invention has a shrinkage due to a relaxed treatment in boiling water of below 13%, preferably 10–7%, based on the original length of the undrawn filament, and a strength of 3–9 grams per denier with an initial Young's modulus of 70–30 grams per denier.

The ternary copolyamide constituting the fiber of the present invention has properties suitable for the object of the present invention in several respects, namely:

(1) Orientation due to drawing is high because the crystallinity of the ternary copolymer is large, the orientation of a drawn yarn is high and a yarn having an excellent tenacity can be provided. In contrast, when the crystallinity is poor, the orientation and strength of the drawn fiber are low.

(2) Heat setting property is good. This is due to the good crystallinity of the ternary copolyamide. By heat setting it is possible to decrease remarkably the boiling water shrinkage and advance the dimensional stability of the product. Also false twisting processing can be carried out at a high temperature to obtain a good crimped yarn.

(3) Melting point is low. Because the melting point of the ternary copolyamide is in the range 265–200° C., the synthesis and melt spinning of this material are easy and the spinnability is good. Melting point is measured by a method described below.

(4) Dyeability is good. The dyeability due to receptivity to acidic dyestuffs is relatively good. Accordingly, clear dyeing is possible.

Further, the X-ray diffraction pattern of oriented crystalline fiber is similar to that of paraxylylene sebacamide. The diffraction patterns of hexamethylene sebacamide and metaxylylene sebacamide are also evident at higher concentrations of these components. However, in each case, it is an X-ray pattern of a fiber with a high degree of crystallinity and orientation.

This ternary copolyamide of the present invention is synthesized by a method similar to those used in other polyamide processes. Namely, the polyamide salts of paraxylylene sebacamide, metaxylylene sebacamide, and hexamethylene sebacamide, within the concentration limits shown in the figure, are mixed. Water and viscosity control agents are added to the mixture as occasion demands and the mixture is polycondensed with heating under pressure in an inert gas atmosphere, such as nitrogen gas or carbon dioxide. In this case, it is preferable to make the upper limit of the polymerization temperature 300° C. for the purpose of avoiding gelation and coloration. However, the copolymer may be heated to a temperature above 300° C. for a short period for the purpose of extruding the copolymer from the polymerization reactor at the final stage of the polymerization.

The inherent viscosity of the polyamide product is about 0.65–1.50. The method of spinning is an ordinarily employed method of melt spinning, whereby undrawn filaments having good drawability are obtained. As the spinning temperature, a temperature within the range of a temperature 10° C. to 70° C. higher than the melting point, depending on viscosity, but up to a maximum of 330° C., may be adopted. Preferably, it is desirable to make the upper limit 310° C.

As to the drawing, although cold drawing is possible, drawing with heating, such as by a hot pin or hot plate, is suitable. Because the phenomenon of "superdraw" is not experienced with the fibers of the present invention, a hot pin temperature in the range 50° C.–150° C. or a hot plate temperature in the range 20–130° C. below the melting point of the polymer may be used. The draw magnification is at least 2 times, preferably 3–7 times, the length of the undrawn fiber.

The drawn yarn thus obtained is good in dimensional stability, even without heat treatment, having a high strength and being good in dyeability by acidic dyestuffs. However, subjecting the drawn yarn to a relaxed heat treatment is desirable because it drastically lowers the boiling water shrinkage. If relaxed heat treatment is used a hot plate temperature of 180–230° C. is appropriate.

Utilizing the properties described above, it is possible to make the fiber of the present invention into a knitted good of a textured yarn, a woven fabric of a textured yarn, a woven fabric of filaments or a producers textured yarn by conjugation with nylon 6 or nylon 66. Also, in the forms of filaments and staple, it may be used as various kinds of clothing, interior decorations, beddings, carpeting and for industrial use such as tire cord.

Next, the present invention will be explained in more detail with reference to examples together with comparative examples.

The physical properties of copolyamide are determined by the following methods:

(1) Inherent viscosity: A sample is dissolved in concentrated sulfuric acid to a concentration of 0.5% and the inherent viscosity is measured at 30° C.

(2) Melting point: A small piece of the polymer is heated under a polarization microscope equipped with a heating plate. Its melting point is taken to be the temperature at which polarization disappears.

(3) Boiling water shrinkage: A sample is treated in a relaxed state under no tension in boiling water for 30 minutes. The yarn lengths before and after the treatment are measured under a load of 50 milligrams per denier and the shrinkage, as a percentage, of the original lengths is then calculated.

(4) Initial Young's modulus: The yarn, conditioned at a temperature of 20° C. and a relative humidity of 65%, is pulled at a tensile speed of 100%/minute to depict a stress-strain curve, and the initial Young's modulus is sought from the gradient of the initial stage portion of said curve.

EXAMPLE 1

A polymerization reactor was charged with 65 parts of paraxylylene sebacamide salt, 15 parts of metaxylylene sebacamide salt, 20 parts of hexamethylene sebacamide salts, 57 parts of water, and 0.82 part of paraxylylene diamine as a viscosity control agent. The air inside was replaced by nitrogen and the reactor was heated to 285° C. When the internal temperature reached 180° C. and the internal pressure reached 10 kg./cm.$^2$, water was discharged to maintain this pressure. After controlling the pressure for 3.5 hours, pressure maintenance was discontinued and reactor internal pressure was reduced to atmospheric pressure in 1 hour. After the internal temperature reached 285° C., heating was continued for 1 more hour to maintain this temperature. Then the pressure was reduced for about 10 minutes while foams were removed. Thereafter the reactor was re-pressurized with nitrogen. After the reaction was complete and the internal reactor pressure had returned to atmospheric pressure, the content thereof was extruded in the form of gut. This polymeric material had an inherent viscosity of 0.90 and a melting point of 258° C.

The extruded gut was cut into chips, which chips were extruded through a spinneret having twenty-four orifices of 0.3 mm. diameter at an extrusion temperature of 290° C. The extruded filaments were wound at a speed of 300 meters/minute to obtain undrawn filaments. Using a hot pin at 70° C. and a hot plate at 150° C., these filaments were then drawn to 4.2 times the original length to obtain a 70 denier/24 filaments drawn yarn having a strength of 5.8 grams/denier, an elongation of 28%, an initial Young's modulus of 51 grams/denier and a boiling water shrinkage of 12%. The composition of this copolymer is shown by point "a" in the figure. This yarn was false twisted at a false twisting temperature of 210° C. to obtain a textured yarn having good crimp characteristics and made a jersey knit cloth with a good feel.

EXAMPLE 2

To 60 parts of paraxylylene sebacamide salt, 20 parts of metaxylylene sebacamide salt, and 20 parts of hexamethylene sebacamide salt, 0.2 part of benzoic acid was added as a viscosity control agent. The mixture was well mixed and charged in an autoclave in which the air was replaced by nitrogen. The autoclave was then heated to 265° C. and the internal pressure of the autoclave was controlled at 10 kg./cm.$^2$. After heating for 4 hours, the pressure was allowed to reduce to atmospheric pressure in 1 hour, and the autoclave temperature was maintained at 265° C. under atmospheric pressure for 2 more hours to complete the polycondensation. The obtained polymer was a colorless white crystalline polymer having an inherent viscosity of 0.86 and a melting point of 248° C. Said polymer was melt spun at a spinning temperature of 260° C. to obtain undrawn filaments, which were drawn to 4 times the original length over a hot plate at 150° C. to obtain a drawn yarn having a strength of 3.6 grams/denier, an elongation of 28%, an initial Young's modulus of 52 grams/denier, and a boiling water shrinkage of 9.3%. The composition of this copolymer is shown by point "b" in the figure.

The X-ray diffraction pattern of said yarn were almost the same as that of paraxylylene sebacamide fiber, being very good in crystallinity.

EXAMPLE 3

By a method of polymerization the same as that in Example 2, a copolymer having a composition of 50% by weight of paraxylylene sebacamide salt, 15% by weight of metaxylylene sebacamide salt and 35% by weight of hexamethylene sebacamide salt (corresponding to point "c" in the figure) was obtained by polycondensation. This copolymer was also white, having good crystallinity, a melting point of 235° C. and an inherent viscosity of 0.97. This copolymer was melt spun at a spinning temperature of 250° C. to obtain undrawn filaments, that were drawn to 7 times their original length over a hot plate at 180° C. The drawn yarn had good yarn qualities including a strength of 3.6 grams/denier, an elongation of 14%, an initial Young's modulus of 39 grams/denier and a boiling water shrinkage of 7.0%.

EXAMPLE 4

By the method described in Example 2, a copolymer having a composition of 40% by weight of paraxylylene sebacamide salt, 40% by weight of metaxylylene sebacamide salt and 20% by weight of hexamethylene sebecamide salt (corresponding to point "d" in the figure) was prepared. The product was a white copolymer good in crystallinity, having a metling point of 221° C. and an inherent viscosity of 0.95.

Said copolymer was melt spun at a spinning temperature of 230° C. to obtain undrawn filaments, that were drawn to 5.5 times their original length using a hot plate at 180° C. to obtain a drawn yarn having a strength of 6.2 grams/denier, an elongation of 13%, an initial Young's modulus of 54 grams/denier and a boiling water shinkage of 8.4%.

EXAMPLE 5

To 70 parts of paraxylylene sebacamide salt, 15 parts of metaxylylene sebacamide salt and 15 parts of hexamethylene sebacamide salt, 43 parts of water and 0.2 part of benzoic acid were added and the mixture was polymerized as in Example 2. The product was a colorless, strong polymer, having a melting point of 260° C. and an inherent viscosity of 0.92.

This polymer was melted at a temperature of 290° C. and melt spun through a spinneret having 6 orifices. The undrawn filaments thus obtained were drawn to 4 times their original length over a hot pin at 70° C. and a hot plate at 150° C. to obtain a white 42 denier drawn yarn having a strength of 4.2 grams/denier, an elongation of 32%, an initial Young's modulus of 40 grams/denier and a boiling water shrinkage of 9.7%. The composition of this copolymer is shown by point "e" in the figure.

EXAMPLE 6

By the method described in Example 2, copolymers having compositions of 40% by weight of paraxylylene sebacamide salt, 30% by weight of metaxylylene sebacamide salt and 30% by weight of hexamethylene sebacamide salt (corresponding to point "f" in the figure and referred to below as copolymer "f") and 40% by weight of paraxylylene sebacamide salt and 60% by weight of hexamethylene sebacamide salt (corresponding to point "g" in the figure and referred to below as copolymer "g") were prepared. The two copolymers were melted at 245° C. and extruded to obtain undrawn filaments, that were drawn to 4.5 times their original length over a hot pin at 70° C. and a hot plate at 150° C.

These copolymers were found to have the following properties:

|  | Copolymer f | Copolymer g |
| --- | --- | --- |
| Melting point, ° C | 222 | 233 |
| Inherent viscosity | 0.79 | 0.82 |
| Strength, g./d | 3.1 | 3.8 |
| Elongation, percent | 24 | 33 |
| Initial Young's modulus, g./d | 46.5 | 43.6 |

From this comparison it is seen that with the addition of metaxylylene sebacamide, the initial Young's modulus increased.

Comparative Example 1

A copolymer consisting of 20 parts of paraxylylene sebacamide salt, 50 parts of metaxylylene sebacamide salt and 30 parts of hexamethylene sebacamide salt (corresponding to point "h" in the figure) was polymerized as in Example 2. The product, with a melting point of 199°

C. and an inherent viscosity of 0.78, was somewhat less desirable because the melting point was below 200° C.

Comparative Example 2

A copolymer consisting of 90 parts paraxylylene sebacamide salt, 5 parts of metaxylylene sebacamide salt and 5 parts of hexamethylene sebacamide salt (corresponding to point "i" in the figure) was polymerized as in Example 1. The product had a melting point of 275° C. and an inherent viscosity of 1.17. However, because the melting point was too high to be polymerized and spun, it showed an inclination to form a gel during spinning and was therefore not satisfactory.

We claim:

1. A drawn ternary copolyamide fiber consisting, by weight, of 30–80% paraxylylene sebacamide units, 10–60% metaxylylene sebacamide units and 10–60% hexamethylene sebacamide units, said fiber characterized by having an initial Young's modulus of at least 30 grams/denier and a boiling water shrinkage of at most 13%.

2. The fiber described in claim 1 wherein said paraxylylene sebacamide units comprise less than 70 weight percent of said copolyamide.

References Cited

UNITED STATES PATENTS

| | | | |
|---|---|---|---|
| 3,053,813 | 9/1963 | Evans et al. | 260—78 |
| 3,164,630 | 1/1965 | Pietrusza | 260—78 |
| 3,536,804 | 10/1970 | Fujimoto et al. | 260—78 R |

HAROLD D. ANDERSON, Primary Examiner

U.S. Cl. X.R.

57—140 R; 260—30.8 R, 78 S; 264—210 F